March 7, 1961 G. D. WHITEHOUSE ET AL 2,973,873
AUTOMATIC COUPLERS FOR RAIL VEHICLES
Filed Nov. 16, 1959 3 Sheets-Sheet 1
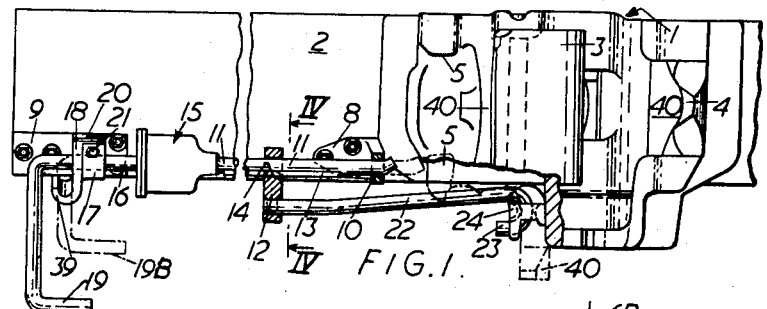
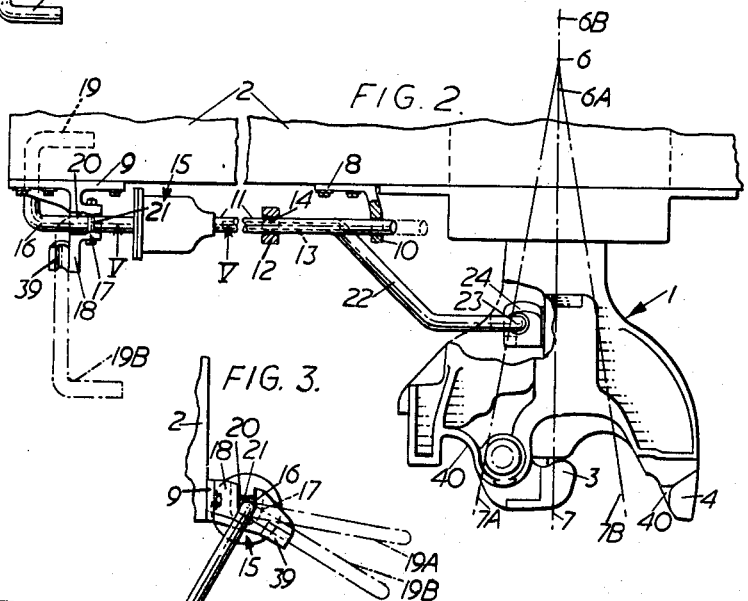
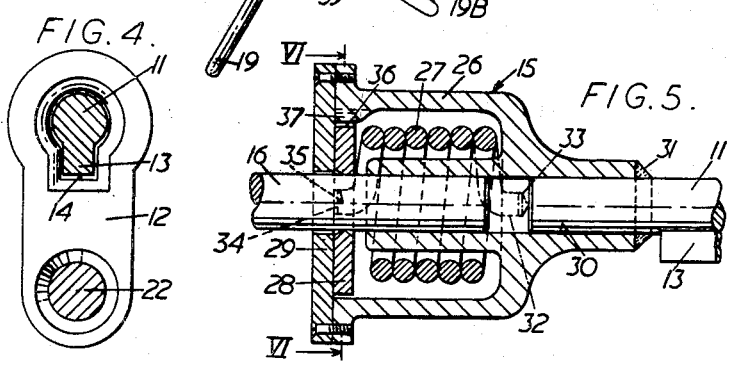
Inventors
Glenroy D. Whitehouse
and John O. Cooke
By
Watson, Cole, Grindle & Watson
Attorneys March 7, 1961  G. D. WHITEHOUSE ET AL  2,973,873
AUTOMATIC COUPLERS FOR RAIL VEHICLES
Filed Nov. 16, 1959  3 Sheets-Sheet 2

Inventors
Glenroy D. Whitehouse
and John D. Cooke
By
Watson, Cole, Grindle & Watson
Attorneys March 7, 1961   G. D. WHITEHOUSE ET AL   2,973,873
AUTOMATIC COUPLERS FOR RAIL VEHICLES
Filed Nov. 16, 1959   3 Sheets-Sheet 3

Inventors
Henray D. Whitehouse
and John D. Cooke
By
Watson, Cole, Grindle & Watson
Attorneys

United States Patent Office 2,973,873
Patented Mar. 7, 1961

2,973,873

AUTOMATIC COUPLERS FOR RAIL VEHICLES

Glenroy D. Whitehouse and John O. Cooke, Sheffield, England, assignors to English Steel Corporation Limited, Sheffield, England Filed Nov. 16, 1959, Ser. No. 853,364

Claims priority, application Great Britain Nov. 20, 1958

5 Claims. (Cl. 213—166)

This invention relates to automatic couplers of the knuckle type for rail vehicles, its object being to enable any one of a pair of mating couplers to be held effectively out of locked position so that automatic coupling is prevented and shunting becomes possible.

The rotor by which the lock is ordinarily released to enable two such couplers to disengage is usually operated from the side of the end of the vehicle by a rod engaging by one end an eye of the rotor and having at the other end a crank handle, the rod being slidably supported in an eyed bracket, with considerable latitude for both horizontal and vertical angular displacement, to allow for the relative movement of the coupler and rotor in either of these directions with respect to the vehicle. In some cases, the rod is divided, the two parts being connected by a crosshead carried by one and having a sliding but non-rotary engagement with the other. The provision for sliding in either of the arrangements is necessitated by the lateral movement of the coupler that must be allowed for. Since it is usual for the lock to be raised by the rotor to effect release, the lock is urged by gravity towards locked position, so that a coupler returns to a condition ready to effect automatic coupling after a mating coupler has been disengaged and the crank handle released. Consequently, any two vehicles brought together are immediately coupled to each other, and one cannot be shunted from the other. To enable shunting to be done, the lock of one coupler must be held out of operation, but this cannot be done simply by hooking the crank handle of the rod after it has turned the rotor, because the engagements of two couplers, in any of the many relative positions they can occupy, would either un-hook the handle or damage the rod.

According to the present invention, lock-operating means for a knuckle-type automatic coupler for a rail vehicle in which the lock is released by means of a rotor rotatable by engagement with the inner end of a rod connected to a crank handle rotatably mounted on the frame of the vehicle, comprises a torsion coupling interposed between the rod and the crank handle, retaining means for attachment to the vehicle frame to receive and retain the crank handle when it has been rotated to load the coupling and to release the lock by consequent rotation of the rod, and means to permit lengthwise movement of the rod relative to the retaining means.

The retaining means may be provided by a bracket, the bracket having a wing formed as a hook to receive the crank handle. In such a case, the hook may be such as to prevent lengthwise movement of the crank handle retained in it, the rod then being formed in two parts, one part being connected to the torsion coupling and the other part being rotatable by the first part, with the necessary permission for lengthwise movement being provided between the two parts. The two parts of the rod may then be connected by a crosshead, advantageously with the crosshead having clearance to enable one part of the rod to rock with respect to the other.

The torsion coupling may comprise a coil spring connected at its respective ends to the crank handle and the rod, or it may be a rubber bushing bonded to members by which it is connected to the crank handle and the rod respectively.

When the crank handle is turned to overcome the locking urge of the lock in the coupler, and retained in that position by the retaining means to prevent return of the lock, the torsion coupling allows the handle to remain retained when the coupler receives the shock of meeting another coupler, liable to displace the rod violently, particularly if the two couplers are much misaligned when they first meet. The provision for sliding of the rod relative to the retaining means prevents damage to the rod by horizontal misalignment of the meeting couplers. Consequently, as the two couplers become aligned one with the other, the torsion coupling ensures that the rotor of the one coupler is held by the handle in a position to prevent engagement of that coupler to the other. One vehicle may therefore be shunted from the other.

The release of the handle from the retaining means restores the coupler to operative condition.

The invention will now be described in greater detail with reference to the accompanying drawings, in which:

Figure 1 is an end elevation of an automatic coupler of the well-known "F-type" provided, in accordance with the invention, with means for holding the lock out of operation;

Figure 2 is a plan of Figure 1;

Figure 3 is an elevation from the left-hand end of the left-hand portion only of Figure 1;

Figure 4 is an enlarged section on the line IV—IV of Figure 1;

Figure 5 is an enlarged section on the line V—V of Figure 2;

Figure 7:
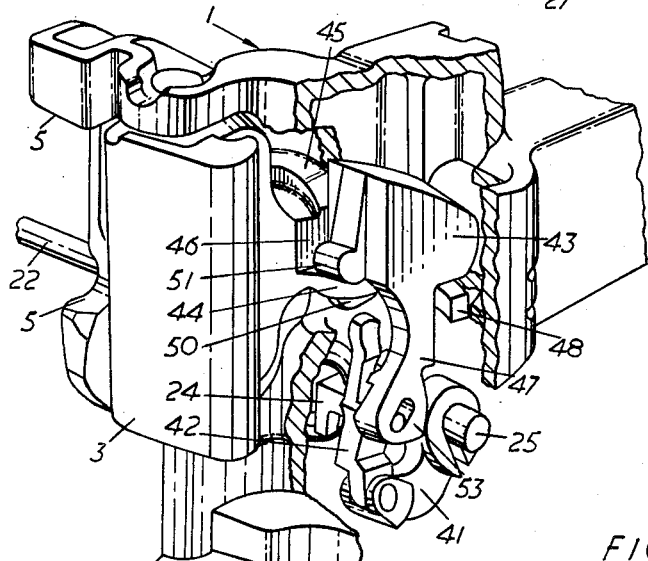
Figure 7 is a perspective view of the coupler, broken away to show the lock operating mechanism in locked position.
Figure 8:
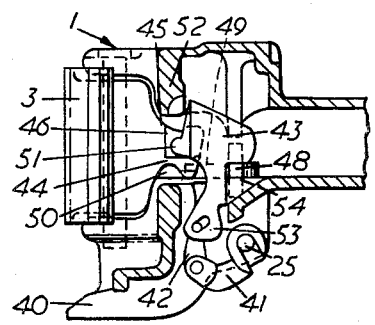
Figure 8 is a small scale longitudinal section of Figure 7.
Figure 9:
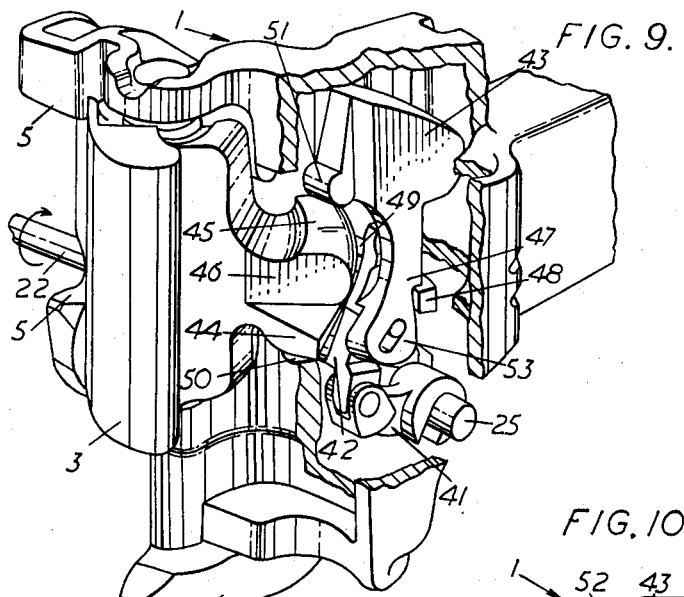
Figure 10:
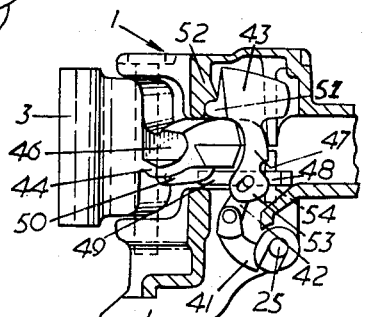
Figure 11:
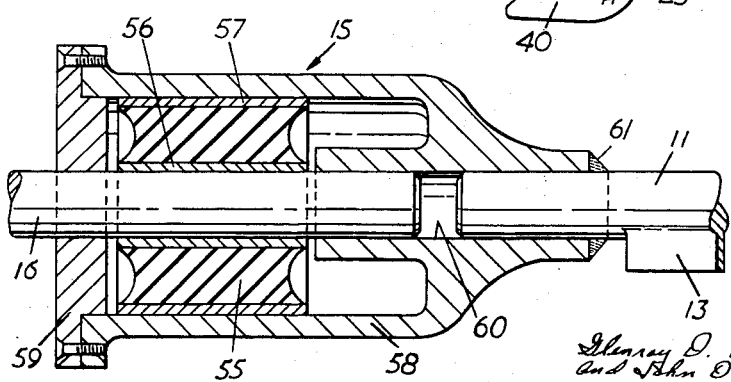

Figure 9 corresponds to Figure 7, but shows the lock operating mechanism in "lock-set" position;

Figure 10 is a further small scale longitudinal section of the coupler, showing the lock operating mechanism in "knuckle-thrown" position; and Figure 11 corresponds to Figure 5, but shows a simple alternative.

In Figures 1 to 3, an "F-type" automatic coupler 1 mounted at one end of a vehicle frame 2 has a knuckle 3, a nose 4, and cheeks 5 for interengagement with the corresponding knuckle, cheeks, and nose of a similar coupler (not shown), and is pivotally mounted at 6 to permit lateral movement between extreme axial positions 7A, 7B to either side of the central position 7. The pivot 6 is carried by buffing gear (not shown), which permits outward movement (usually referred to as "travel") of the pivot to the position 6A, or inward movement (usually referred to as "buff") to the position 6B.

Two brackets 8, 9 are bolted to the same end of the frame 2, the bracket 8 having an eye 10 for slidably supporting a rod 11 on which a crosshead 12 (see also Figure 4) is slidably mounted, but is prevented from rotation relative to the rod 11 by a key 13 on the latter and a key-hole 14 in the crosshead. One end of the rod 11 is secured to a torsion coupling 15 and the other end is bent or otherwise secured against withdrawal from the eye 10. The torsion coupling 15 connects the rod 11 with a stem 16 which passes through an eye 17 in a wing 18 on the bracket 9 before bending into a crank handle 19 (see also Figure 3). The eye 17 is formed by an open slot 20, for ease of assembly and fitting of the rod 11, and the stem 16, with a bolt 21 to retain the stem 16. One end of a rod 22 is welded to the crosshead 12 and the other end is bent to form a hook 23 for engagement with an eye 24 in one end of the rotor 25 (Figures 7 to 10) of the coupler 1. The rods 11, 22 form a two-part connection between the torsion coupling 15 and the rotor 25, the crosshead 12 providing for relative lengthwise movement between the two parts.

Figure 6:
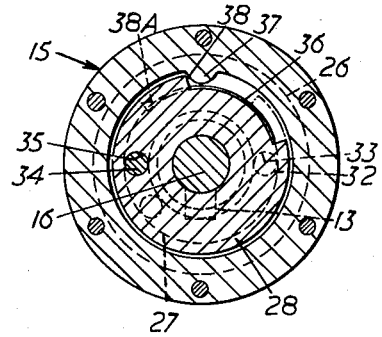
Figure 6 is a section on the line VI—VI of Figure 5.

In the construction shown in Figures 5 and 6, the torsion coupling 15 consists of a housing 26, coil spring 27, stop-plate 28, and cover-plate 29. The rod 11 enters a journal bearing 30 in the housing 26, to which it is secured by welding 31, and the bearing 30 extends inwardly of the housing to receive also the stem 16 in alignment with the rod 11, but with the stem 16 able to rotate with respect to the housing. One end 32 of the spring 27 engages in a hole 33 in the housing 26, while the other end 34 engages in a hole 35 in the stop-plate 28, which is welded on the stem 16 and formed with an elongated peripheral recess 36 to receive a projection 37 on the inside of the housing. The relative angular disposition of the hole 35 and the end 38 of the recess 36 may be predetermined to ensure that when the torsion coupling 15 is assembled with the coil spring 27 in its free state, i.e. not loaded, the projection 37 is just contacted by the end 38 of the recess, so that the spring becomes loaded only upon relative rotation taking place between the plate 28 and the housing 26. However if pre-loading of the spring 27 is desired, the relative angular disposition of the hole 35 and the end 38 of the recess must be predetermined to ensure that when the coupling is assembled the coils must be tightened to enable the projection 37 to enter the recess, the consequent pre-loading of the spring being maintained by engagement of the projection against the end 38 of the recess, so that relative rotation between the plate and the housing 26 applies a further load to the spring.

Rotation of the stem 16 by swinging the crank handle 19 from the full line position in Figure 3 to the position 19A rotates the rod 11, crosshead 12, rod 22, and the rotor 25 for release of the lock (as will be described presently with reference to Figures 7 to 10) and also loads or further loads the spring 27 sufficiently for a considerable spring load to remain applied to the rotor when the handle 19 is moved laterally and lowered into a hook 39 on the wing 18 of the bracket 9 (handle position 19B). The stop-plate 28 is now positioned with the end 38 of the recess 36 in the position 38A, that is, with the projection 37 substantially in mid-position in the recess, so that as the coupler 1 moves laterally in either direction between the extreme axial positions 7A, 7B and/or travels or buffs between the extreme positions 6A, 6B, the load on the spring 27 increases or decreases slightly in accordance with the added or diminished rotation imposed on the cross-head 12 and the rod 11, without either completely removing the load on the spring or causing either end of the recess 36 to engage the projection 37 to render the coupling 15 non-flexible. Thus, the handle 19 remains retained by the hook 39 to maintain the torsion on the rotor and prevent return of the lock, until the handle is manually released from the hook.

Clearance in the eyes 10 and 17 and in the keyhole 14 prevents jamming of the rod 11 and stem 16 by any slight angular displacement of the rod 22 relative to the rod 11 that takes place as the coupler 1 moves laterally and/or buffs or travels, and the provision for sliding of the crosshead 12 on the rod 11 prevents damage by horizontal misalignment of the meeting couplers. The two couplers become aligned by means of guiding surfaces 40, but the torsion coupling ensures that the rotor 25 of the one coupler 1 is held by the handle 19 engaged in the hook 39 to prevent locking engagement of that coupler to the other. One vehicle may therefore be shunted from the other.

Even though the coupler, of which details of a usual construction are shown in Figures 7 to 10, may itself be provided with automatic means for setting the lock in released position, so that the coupler may thereafter, but not necessarily immediately thereafter, be disengaged from a mating coupler, the impact between couplers of shunted vehicles will almost invariably cause the automatic lock-set to be rendered inoperative. However, the operating mechanism according to the invention effectively overcomes this tendency for the vehicles to be re-coupled during shunting.

In Figures 7 to 10, the rotor 25 supports and is adapted to rotate an arm 41 pivoted to the lower end of a link 42 for lifting the lock 43. In the locked position (Figures 7 and 8), the head of the lock rests on a shelf 44 formed in an inward arm 45 of the knuckle 3 and abuts a face 46, thus preventing swinging of the knuckle to release the mating coupler (not shown). Partial lifting of the lock 43 by rotation of the rotor 25 brings the head of the lock clear of the face 46 to enable the knuckle 3 to be swung open (Figure 9), either immediately or sometime thereafter if the lock 43 is maintained in raised or "lock-set" position by a heel 47 resting on one end 48 of a horizontal lever 49 the other end of which lies behind a projection 50 depending from the arm 45. However, the lock 43 cannot be maintained in "lock-set" position during shunting operations without applying torque continuously to the rotor 25, because the first impact of shunting dislodges the heel 47 from the end 48 of the lever 49.

In the absence of a mating coupler, the lock 43 may be lifted to its highest position (Figure 10), when a beak 51 on the head of the lock engages a projection 52 inside the coupler 1, so causing the lock to be rocked for a tail 53 to strike the end 48 of the lever 49, thereby causing the latter to be swung about its vertical pivot 54 into engagement with the projection 50, to throw the knuckle 3 to open position. The load on the rotor 25 imposed by the torsion coupling 15 will, in fact, maintain the lock in its highest position, but the resilience in the coupling will allow a mating coupler to push the knuckle 3 to closed position, i.e., permit slight reverse rotation of the rotor as the lever 49 is rocked back against the tail 53 of the lock 43, which is then itself rocked about the projection 52. However, with the handle 19 (Figures 1 to 3) retained by the hook 39, the lock 43 cannot in any circumstances fall into position to lock the knuckle 3.

In the alternative construction of torsion coupling 15 shown in Figure 11, a rubber bushing 55 is used instead of a spring, and is bonded round a metal sleeve 56 which is a press fit on the stem 16 and to the inside of a metal sleeve 57 which is a press fit in a housing 58. The stem 16 is journalled in a cover plate 59 and an elongated bearing 60 into which the rod 11 is fitted and secured by welding 61. If pre-loading of the bushing 55 is desired, a stop plate (not shown) may be welded to the stem 16 and be formed with an elongated peripheral recess for co-operation with a projection inside the housing, as in Figures 5 and 6.

What we claim is:

1. In lock-operating means for a knuckle-type automatic coupler for a rail vehicle in which the lock is released by means of a rotor rotatable by engagement in an eye in the rotor of a hook on the inner end of a rod the outer end of which is connected to a rod having a crank handle by means of a crosshead axially slidable on but non-rotatable with respect to the rod of the crank handle which is rotatably mounted in a pair of spaced brackets on the frame of the vehicle, the provision of a torsion coupling interposed between the handle and its rod, together with a wing on the outer bracket, said wing being formed into an upwardly facing hook to receive the crank handle when it has been first rotated to release the lock by consequent rotation of the rods and rotation of the handle continued to beyond the hooked wing, and then moved laterally to extend directly over the hooked wing, when the load applied to the torsion coupling in the rotation of the handle to beyond the hooked wing holds the handle in the hook formed by the wing.

2. In lock-operating means for a knuckle-type automatic coupler for a rail vehicle in which the lock is released by means of a rotor rotatable by engagement in an eye in the rotor of a hook on the inner end of a rod the outer end of which is connected to a rod having a crank handle by means of a crosshead axially slidable on but non-rotatable with respect to the rod of the crank handle which is rotatably mounted in a pair of spaced brackets in the frame of the vehicle, the provision of a torsion coupling comprising a torsion member co-axial with the crank handle and its rod and providing a connection between the handle and its rod, a housing containing the torsion member and rotatable with the rod of the crank handle, a plate secured to the crank handle, the plate having a peripheral recess, and an inward projection from the housing into the recess to enable the torsion member to be pre-loaded, together with a wing on the outer bracket, said wing being formed into an upwardly facing hook to receive the crank handle when it has been first rotated to release the lock by consequent rotation of the rods and rotation of the handle continued to beyond the hooked wing and then moved laterally to extend directly over the hooked wing, when the load applied to the torsion coupling in the rotation of the handle to beyond the hooked wing holds the handle in the hook formed by the wing.

3. In lock-operating means for a knuckle-type automatic coupler for a rail vehicle in which the lock is released by means of a rotor rotatable by engagement in an eye in the rotor of a hook on the inner end of a rod the outer end of which is connected to a rod having a crank handle by means of a crosshead axially slidable on but non-rotatable with respect to the rod of the crank handle which is rotatably mounted in a pair of spaced brackets on the frame of the vehicle, the provision of a torsion coupling comprising a coil spring connected at its respective ends to the crank handle and the rod of the crank handle, together with a wing on the outer bracket, said wing being formed into an upwardly facing hook to receive the crank handle when it has been first rotated to release the lock by consequent rotation of the rods and rotation of the handle continued to beyond the hooked wing, and then moved laterally to extend directly over the hooked wing, when the load applied to the torsion coupling in the rotation of the handle to beyond the hooked wing holds the handle in the hook formed by the wing.

4. In lock-operating means for a knuckle-type automatic coupler for a rail vehicle in which the lock is released by means of a rotor rotatable by engagement in an eye in the rotor of a hook on the inner end of a rod the outer end of which is connected to a rod having a crank handle by means of a crosshead axially slidable on but non-rotatable with respect to the rod of the crank handle which is rotatably mounted in a pair of spaced brackets on the frame of the vehicle, the provision of a torsion coupling comprising a coiled spring, a plate secured to the crank handle, one end of the spring being connected to the plate, a peripheral recess in the plate, a housing for the coil spring secured to the rod of the crank handle, the other end of the spring being connected to the housing, and an inward projection on the housing projecting into the recess to enable the coil spring to be pre-loaded together with a wing on the outer bracket, said wing being formed into an upwardly facing hook to receive the crank handle when it has been first rotated to release the lock by consequent rotation of the rods and rotation of the handle continued to beyond the hooked wing and then moved laterally to extend directly over the hooked wing, when the load applied to the torsion coupling in the rotation of the handle to beyond the hooked wing holds the handle in the hook formed by the wing.

5. In lock-operating means for a knuckle-type automatic coupler for a rail vehicle in which the lock is released by means of a rotor rotatable by engagement in an eye in the rotor of a hook on the inner end of a rod the outer end of which is connected to a rod having a crank handle by means of a crosshead axially slidable on but non-rotatable with respect to the rod of the crank handle which is rotatably mounted in a pair of spaced brackets on the frame of the vehicle, the provision of a torsion coupling comprising a rubber bushing, and internal and external sleeves bonded to the bushing, the sleeves respectively being connected to the crank handle and the rod of the crank handle, together with a wing on the outer bracket, said wing being formed into an upwardly facing hook to receive the crank handle when it has been first rotated to release the lock by consequent rotation of the rods and rotation of the handle continued to beyond the hooked wing and then moved laterally to extend directly over the hooked wing, when the load applied to the torsion coupling in the rotation of the handle to beyond the hooked wing holds the handle in the hook formed by the wing.

References Cited in the file of this patent

UNITED STATES PATENTS

| | | |
|---|---|---|
| 717,663 | Fabian et al. | Jan. 6, 1903 |
| 1,926,117 | Small | Sept. 12, 1933 |
| 2,000,987 | Richards | May 14, 1935 |
| 2,356,336 | Metzger | Aug. 22, 1944 |
| 2,499,567 | Bronson | Mar. 7, 1950 |